US010741005B1

(12) United States Patent
Munz

(10) Patent No.: US 10,741,005 B1
(45) Date of Patent: Aug. 11, 2020

(54) PUMP BOT

(71) Applicant: Chris Munz, Reno, NV (US)

(72) Inventor: Chris Munz, Reno, NV (US)

( * ) Notice: Subject to any disclaimer, the term of this patent is extended or adjusted under 35 U.S.C. 154(b) by 0 days.

(21) Appl. No.: 16/504,450

(22) Filed: Jul. 8, 2019

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| *A63B 21/00* | (2006.01) |
| *A63B 23/02* | (2006.01) |

(52) U.S. Cl.
CPC ...... *G07F 17/3209* (2013.01); *G07F 17/3216* (2013.01); *G07F 17/3223* (2013.01); *G07F 17/3295* (2013.01); *A63B 21/4045* (2015.10); *A63B 23/0222* (2013.01)

(58) Field of Classification Search
USPC .............................. 463/1, 20, 22, 30, 39, 42
See application file for complete search history.

(56) References Cited

U.S. PATENT DOCUMENTS

2003/0096686 A1* 5/2003 Walden .................. A63B 67/10 482/148

* cited by examiner

*Primary Examiner* — Adetokunbo O Torimiro
(74) *Attorney, Agent, or Firm* — Mark A. Goodman, Esq.

(57) ABSTRACT

A game machine for performing hip/pelvic thrusting game or exercise is disclosed. The game machine may include a floor plate, at least one post member, a torso member, a shaft member, a thrusting pad element and a means for providing resistance. The shaft member is partially inserted into a receiving face of the torso member. The means for providing resistance to a reciprocating motion of the shaft member may be located inside the torso member and is configured in such a manner that the reciprocating shaft member is moved in and out of the torso member by the thrusting motion of the game player. The game machine may be connected to the internet to allow for players to compete remotely and for players to maintain an account storing game playing records and information.

28 Claims, 8 Drawing Sheets

PUMP BOT

BACKGROUND OF THE DISCLOSURE

Technical Field of the Disclosure

The present disclosure relates generally to game/exercise machines, and more particularly to a game machine designed to enable the user to perform exercise/game by performing a hip/pelvic thrusting motion.

Description of the Related Art

A wide variety of gaming machines have been developed in the art. These gaming machines provide entertainment to people. Most gaming machines available at, for instance, pizza restaurants are either in the nature of video games, or relatively inactive games such as pinball. There are a few of popular gaming machines requiring active physical participation that may be provided at bars/restaurants, corporate/team building events, parties, and other gatherings. Most notably would be a mechanical bull riding machine. Mechanical bulls are popular in part because they require active physical participation, they encourage camaraderie, allow participants to compete with each other, they are fun, encourage good humor, and require the participant to exercise physically. Even so, mechanical bull riding is dangerous as it causes injuries to people. Further, these bull riding machines do not allow the user to perform calorie burning exercises like hip/pelvic thrust exercise.

Hip/pelvic thrust exercise plays a vital role in strengthening hips, lower back muscles, leg muscles and thighs of human body. In this modern lifestyle, people sit for prolonged period in front of computer systems as part of their job. This situation leads to muscle atrophy that weakens our body muscles mainly in legs and gluteus muscles. The hip/pelvic exercise stabilizes pelvis which enables us to do our daily movements like walking, standing up, and stair stepping smoothly and keeps our body healthy and fit. Several pelvic thrust exercise devices have been developed to reduce hip flexor inflammation and improve posture and hip-to-knee coordination. Further, these devices increase the strength and size of the gluteus muscles for improved and powerful sports performance.

One hip thrust exercise device includes a bench having an H-shaped frame having a middle beam that is slightly shorter than the distance established between the disks of the bar to be lifted, and on which a back rest or seat is provided, comprising height-regulating means, characterized in that the height of the side beams is such that the bar can be rolled over the surface of the beams above the stretched-out body of the user. However, the bench causes discomfort and pain to the user while exercising. Further, the bench is only designed for burning calories. It does not provide any gaming or entertaining means to motivate the user to burn more calories.

Another method for performing hip/pelvic thrust exercise describes an exercise apparatus having an upper body support, a foot support, and an exercise space. Typically, the exercise space is disposed substantially between an upper body support and a foot support, and permits substantial movement of a user's hips in both a forward direction and a rearward direction. This exercise device does not allow participants to compete with each other. Further, this device does not display the amount of calories burned by the user.

Yet another exercise apparatus is adapted to support a user above a floor while the user performs hip thrusts or other exercises. The exercise machine includes a head support and a foot support for supporting the torso and feet of a user so that the hips of the user are suspended in an exercise area between the head support and foot support. This exercise apparatus is bulk in size with complex components thereby increasing the maintenance cost and causing difficulty in transportation. Further, this exercise machine does not indicate whether the exerciser is performing well or not.

Thus, there is a need for a reliable and portable gaming/exercise device that provides a fun atmosphere, encourage competition and camaraderie. Such a needed gaming/exercise device would be adaptable to exercise user's gluteus muscles. Further, such a gaming/exercise device would provide gaming means thereby providing entertainment and motivation to the user to burn more calories. Moreover, such a gaming/exercise device would indicate whether the exerciser is performing well or not. Further, the device would display the amount of calories burned by the user. Such a gaming/exercise device would have simple, soft, padded and cost effective components. Moreover, such a gaming/exercise machine would measure and display energy expended by the user and the thrusting speed achieved by the user. Such a gaming/exercise machine would allow participants to compete with each other. These and other objectives are accomplished by the present invention.

SUMMARY OF THE INVENTION

To minimize the limitations found in the prior art, and to minimize other limitations that will be apparent upon the reading of the specification, the preferred embodiment of the present invention provides a game machine for performing a hip/pelvic thrusting game or exercise that comprises a floor plate, at least one post member, a torso member, a shaft member, a thrusting pad element and a means for providing resistance. The post member includes a first end and a second end. The first end of the post member is perpendicularly connected to the floor plate. The height of the post member is adjustable to accommodate user height. The torso member is connected to the second end of the post member. The shaft member is partially inserted into a receiving face of the torso member thereby establishing an interior end and an exterior end of the shaft member. The thrusting pad element is connected to the exterior end of the shaft member and includes a padded portion. The means for providing resistance to a reciprocating motion of the shaft member is located inside the torso member and is configured in such a manner that the reciprocating shaft member is moved in and out of the torso member by an application and release of force against the thrusting pad element by the game player/user. Any user of the game machine, whether for entertainment or for exercise purposes is hereby defined as a "player." The means for providing resistance is selected from the group consisting of a gear system, a chain and sprocket system, a spring system, belt and pulley system, a pneumatic system, an electromagnetic generator, a hydraulic fluid system, or an electromagnetic alternator. In the preferred embodiment, the means for providing resistance is the chain and sprocket system coupled to the electromagnetic generator. The game machine further includes a flywheel, a freewheel, a return spring and a tachometer sensor. The reciprocating shaft member is connected to the chain, the flywheel and the freewheel. As the player performs a thrust, the thrusting pad element moves towards a backward direction. Thereafter, the return spring moves the shaft member towards a forward direction which pushes the thrusting pad element back to the resting position. The flywheel is designed to maintain momentum while the player performs exercise. The flywheel rotates between each thrust, and it may optionally acquire primary resistance. Further, the flywheel may operate a generator.

The game machine further includes at least one handle member located on an exterior surface of the torso member. The game machine is configured to allow the game player or an exerciser to stand on the floor plate while performing and to apply force to the thrusting pad element via a pelvic/hip thrusting motion. The means for providing resistance may be coupled to a microcontroller that is configured to apply at least one game mode. The game machine further includes a head/display element attached to a top side of the torso member. The head/display member is hereby defined to include any visual display element that may be coupled to the game machine. The head/display element includes one or more visual game indicators. The one or more visual game indicators may be selected from the group consisting of a "High Score," "Calories Burned" indicator, a "Your Score" indicator, a "Time Remaining" indicator, a "Current Speed" indicator, a "Player 1" indicator, a "Player 2" indicator, and a "Press Start" indicator. The head/display element may include a mouth element configured to indicate whether the player is doing well or not. As well, queues may be established to communicate with the players. For instance, "START," "GAME OVER," etc.

The game machine includes at least one audio speaker coupled to the microcontroller. The audio speaker is configured to provide audio clips/music according to the game mode. The audio speaker is configured to play music according to the game mode and to provide audio indicators to the player according to the game mode. The speaker and audio system may be further configured to entice a person by playing music while the game machine is not in use. The player stands on the end of the floor plate during game to provide additional stability to the game machine. The means for providing resistance then provides resistance against the reciprocating shaft member. In the preferred embodiment, the resistance to the shaft member (and the player's pelvic thrusts) can be varied depending on gameplay state/modes such as "easy" or "difficult". The preferred game machine includes a plurality of buttons that provides a way for the player to start the game and select gameplay modes.

The game machine is designed to operate in two modes: gameplay mode and exercise mode. In the gameplay mode, overall pelvic thrust output generated is measured either in watt-hours or in calories and is indicated on the visual game indicator. Here, individual players attempt to beat established high score and multiple players attempt to beat each other's scores. In the exercise mode, the user is meant to continuously provide thrusting for a set duration.

A first objective of the present invention is to provide a game machine for performing hip/pelvic thrusting game or exercise.

A second objective of the present invention is to provide a game machine that is adaptable to operate in game mode and in exercise mode.

A third objective of the present invention is to provide a game machine that motivates the user to burn more calories through games.

A fourth objective of the present invention is to provide a game machine having audible and visual indicators to indicate whether the exerciser/player is performing well or not.

A fifth objective of the present invention is to provide a game machine having a microcontroller adaptable to measure the energy consumed by the player and the thrusting speed achieved by the player.

A sixth objective of the present invention is to provide a game machine having a height adjustable and tilt adjustable post members designed to elevate the game machine above the floor.

Another objective of the present invention is to provide a game machine having a printer that provides players with a paper record of gameplay scores such as total score, energy produced, calories burned and maximum speed achieved.

Yet another objective of the present invention is to provide a game machine designed to accept multiple forms of payment for gameplay such as paper currency, coins and credit cards.

A still further objective of the present invention is to provide a game machine with several visual game indicators showing details like game score, game time, calories burned, and current speed.

These and other advantages and features of the present invention are described with specificity so as to make the present invention understandable to one of ordinary skill in the art.

BRIEF DESCRIPTION OF THE INVENTION

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

Figure 7:
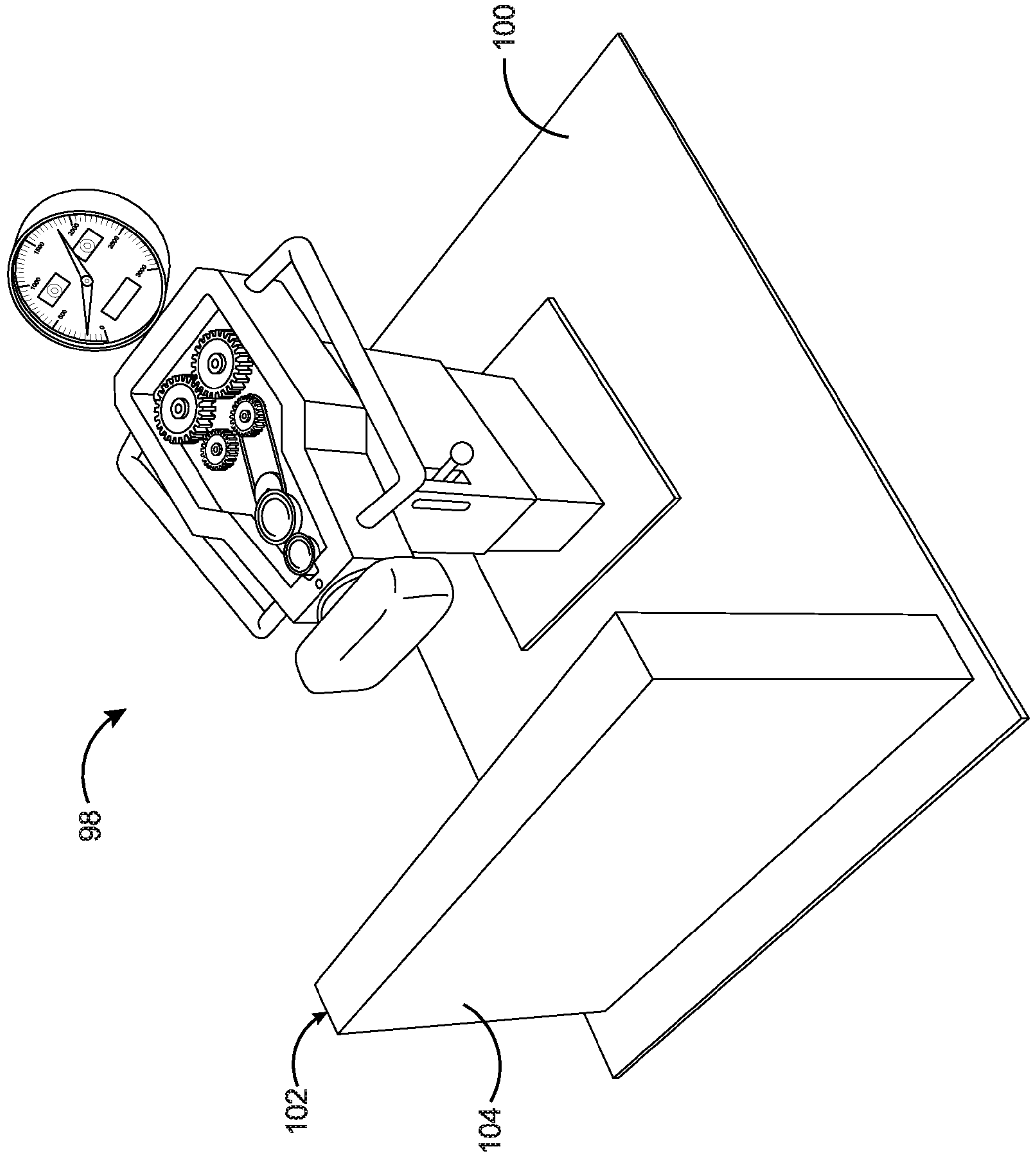
Figure 8:
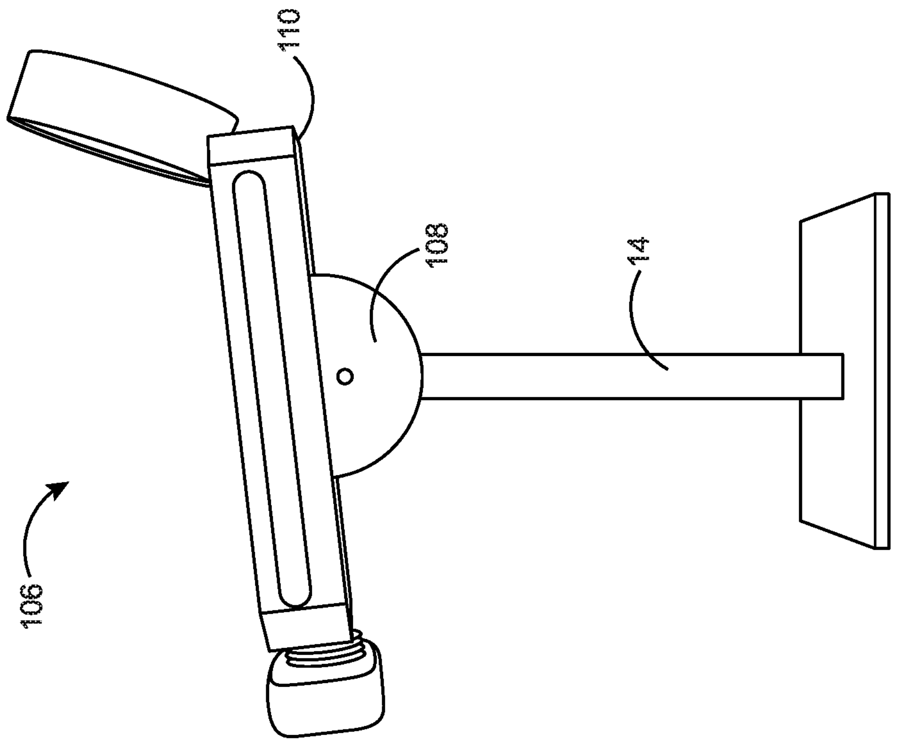

FIG. 7 shows a perspective view of another embodiment of the game machine illustrating a ballast weight positioned on a floor plate of the game machine according to the preferred embodiment of the present invention; and FIG. 8 shows a perspective view of another embodiment of the game machine illustrating a means for adjusting an angle between the torso member and the post member according to the preferred embodiment of the present invention.

DETAILED DESCRIPTION OF THE INVENTION

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
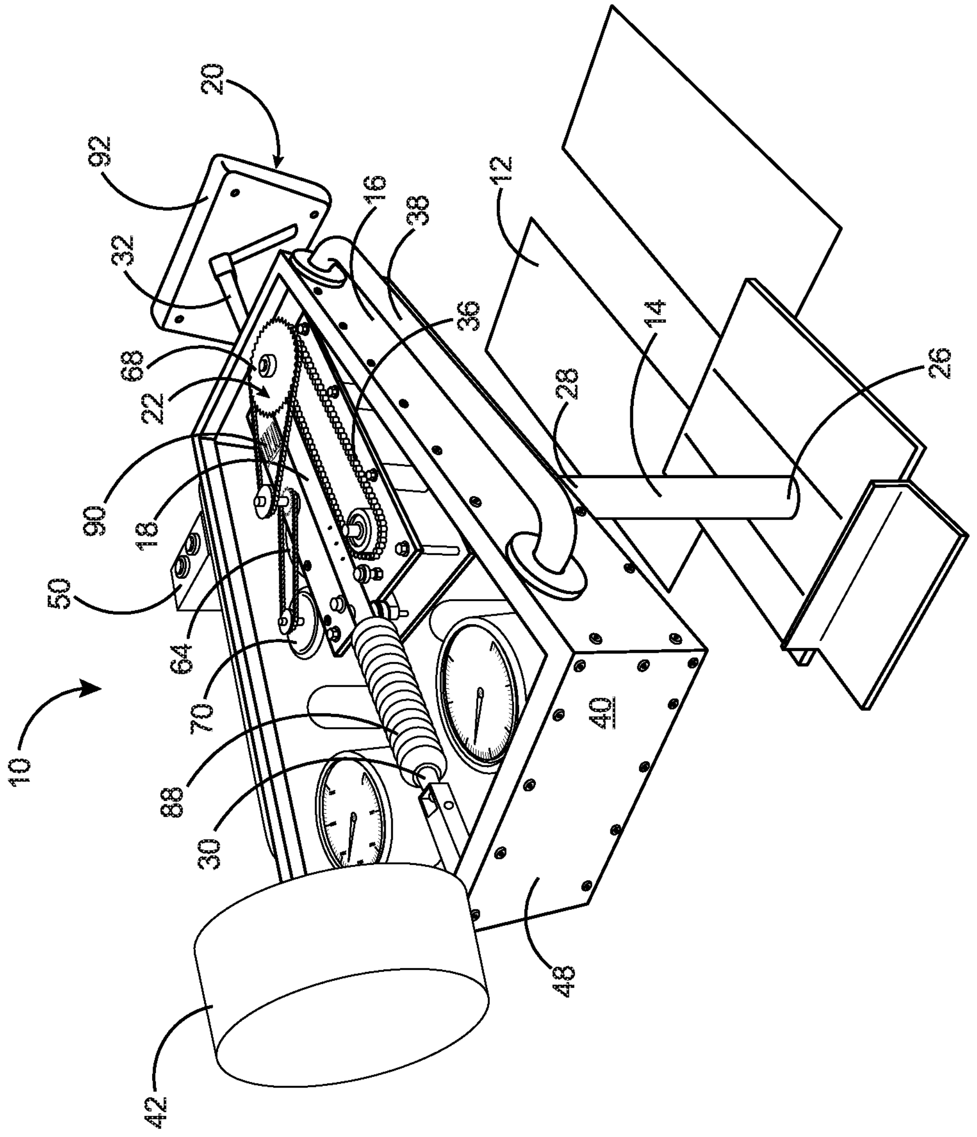
FIG. 1 shows a perspective view of a game machine, illustrating a torso member and a means for providing resistance to a reciprocating shaft member according to the preferred embodiment of the present invention.
Figure 2:
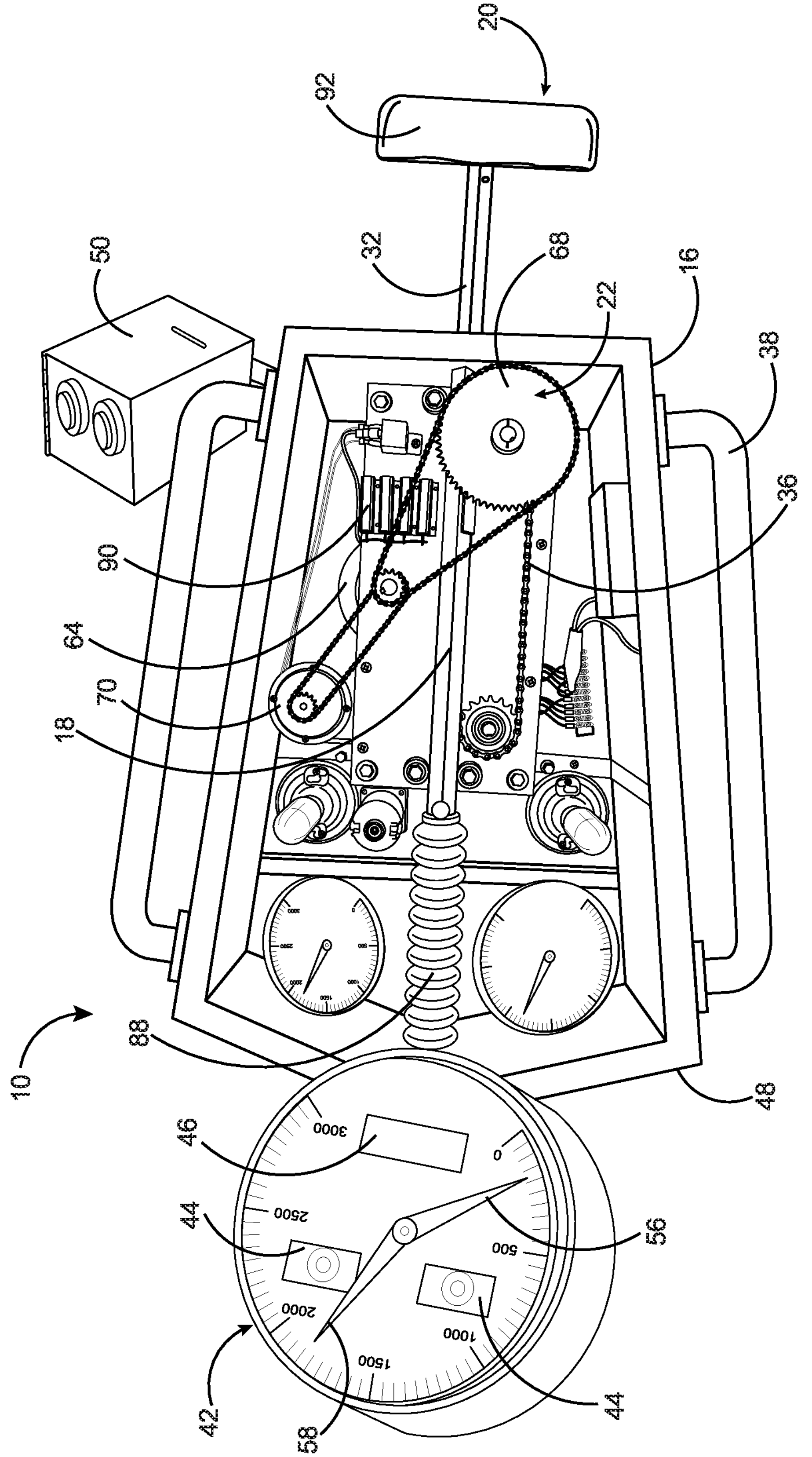
FIG. 2 shows a top perspective view of the game machine, illustrating the torso member and a thrusting pad element according to the preferred embodiment of the present invention.
Figure 3:
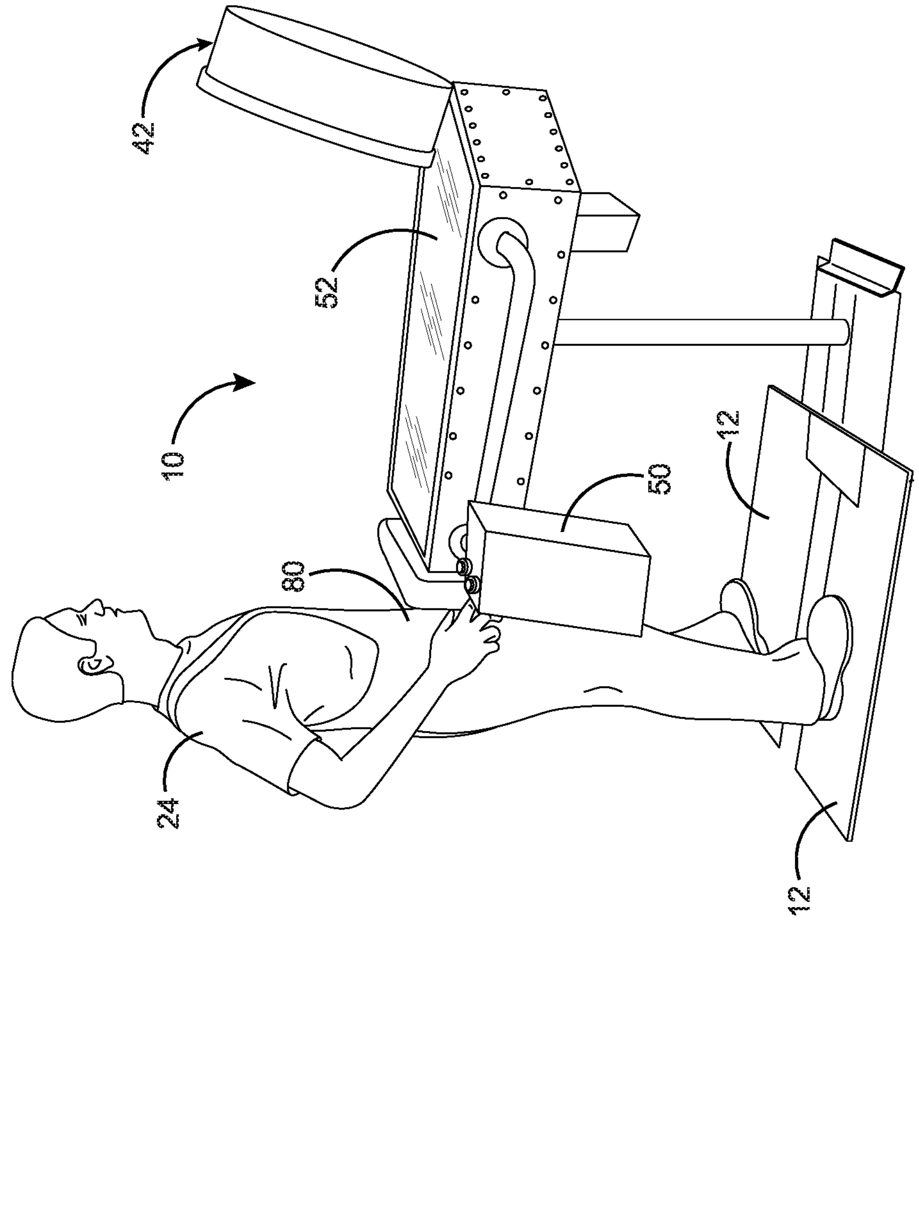
FIG. 3 shows a perspective view of the game machine in use according to the preferred embodiment of the present invention.

Referring to FIGS. 1 and 2, a game machine 10 for performing hip/pelvic thrusting game or exercise comprises a floor plate 12, at least one post member 14, a torso member 16, a shaft member 18, a thrusting pad element 20 and a means for providing resistance 22 is illustrated. By way of clarification, element 22 refers to the any means for providing resistance disclosed herein and any equivalents known in the art. The thrusting pad element 20 is connected to the shaft member 18. The at least one post member 14 includes a first end 26 and a second end 28. The first end 26 of the post member 14 is perpendicularly connected to the floor plate 12. The torso member 16 is connected to the second end 28 of the post member 14 and is parallel to the floor plate 12. The shaft member 18 is partially inserted into a receiving face of the torso member 16 thereby establishing an interior end 30 and an exterior end 32 of the shaft member 18. The thrusting pad element 20 is connected to the exterior end 32 of the shaft member 18 and includes a padded portion 92. The means for providing resistance 22 to a reciprocating motion of the shaft member 18 is located inside the torso member 16 and is configured in such a manner that the reciprocating shaft member 18 is moved in and out of the torso member 16 by an application and release of force against the thrusting pad element 20 by a game player 24 (FIG. 3). The means for providing resistance 22 may be selected from the group consisting of a chain and sprocket system, a spring system, a pneumatic system, an electromagnetic generator 70, a hydraulic fluid system, a belt and pulley system, and an electromagnetic alternator or any equivalents known in the art. In the preferred embodiment, the means for providing resistance 22 is the chain and sprocket system coupled to the electromagnetic generator 70. The game 10 machine further includes a flywheel 64, a freewheel 68, a return spring 88 and a tachometer sensor 90. The reciprocating shaft member 18 is connected to the chain 36, the flywheel 64 and the freewheel 68.

The preferred game machine 10 further includes at least one handle member 38 located on either side of an exterior surface 40 of the torso member 16. The handle member 38 provides a place for the player 24 to grip the game machine 10. In use, as shown in FIG. 3, the game machine 10 is configured to allow the game player or an exerciser 24 to stand on the floor plate 12 while performing and to apply force to the thrusting pad element 20 via a pelvic/hip thrusting motion. Preferably, the thrusting pad element 20 is soft padded to provide comfort to the player 24 while gaming or doing exercise. The player 24 thrusts his/her pelvic area 80 against the padded thrusting pad element 20. As the player 24 performs a thrust, the thrusting pad element 20 moves toward the torso member 16 and the padded portion 92 of the thrusting pad element 20 comes very close to the torso member 16 as shown in FIG. 3. Thereafter, the return spring 88 moves the shaft member 18 forward which pushes the thrusting pad element 20 back to the resting position, which is toward the player 24. In this resting position, the padded portion 92 is far from the torso member 16 as shown in FIG. 2. The flywheel 64 is designed to maintain momentum while the player 24 performs exercise. The flywheel 64 rotates between each thrust and alternatively provides primary resistance.

The floor plate 12 (variations shown as 66 in FIGS. 4 and 100 in FIG. 7) provides a heavy stable surface to attach the game machine 10 to the floor. The player 24 stands on the end of the floor plate 12 during the game to provide additional stability to the game machine 10. The height adjustable post member 14 attached to the floor plate 12 is utilized to elevate the game machine 10 above the floor according to the height of the player/exerciser 24. Further, the post member 14 allows the player 24 to align the game machine 10 with their pelvic area 80. The means for providing resistance 22 provides resistance against the reciprocating shaft member 18. In the preferred embodiment, the resistance to the shaft member 18 (and the player's pelvic thrusts) can be varied depending on different modes of the game such as "easy" or "difficult". The means for providing resistance 22 includes a means for measuring thrusting energy and thrusting speed produced by the player 24.

The means for providing resistance 22 is coupled to a microcontroller (not shown) which is configured to apply at least one game mode. In the preferred embodiment, the game machine 10 has a robotic shape as shown in FIG. 3. The game machine 10 further includes a head element 42 attached to a top side 48 of the torso member 16. The head element 42 includes one or more visual game indicators. The one or more visual game indicators are selected from the group consisting of a "High Score" indicator, a "Calories Burned" indicator, a "Your Score" indicator, a "Time Remaining" indicator, a "Current Speed" indicator, a "Player 1" indicator, a "Player 2" indicator, and a "Press Start" indicator. The head element 42 includes a mouth element 46 configured to indicate state of the game such as whether the player 24 is doing well or not. The mouth element 46 displays a happy mouth and a sad mouth. The happy mouth indicates that the player 24 is doing well and the sad mouth indicates that the player 24 is not doing well.

The head/display element 42 further includes eyes 44 which change state in order to create a facial expression.

The game machine 10 includes at least one audio speaker (not shown) coupled to the microcontroller (not shown). The audio speaker is configured to provide audio clips according to the game mode. In the preferred embodiment, the audio clips have a robotic voice. These audio clips are played before, after and during the game play. The robotic voice encourages players 24 during gameplay or verbally indicates how well the player 24 did at the end of the game. The audio speaker is configured to play music and to provide audio indicators to the player 24 according to the game mode. The speaker is further configured to entice a person by playing music or other sounds/audio clips while the game machine 10 is not in use. The microcontroller is programmed to measure the energy expended and the thrusting speed achieved by the player 24. In the preferred embodiment, one or more sides of the torso member 16 are transparent. In one configuration, the game machine 10 further includes a second game machine, wherein the second game machine is configured to allow a player of the second game machine (not shown) to compete against the player 24 of the first game machine. The robotic shaped game machine 10 includes a plurality of buttons that provides a way for the player 24 to start the game and select gameplay modes. The game machine 10 further includes a printer 50 that provides players 24 with a paper record of gameplay scores such as total score, energy produced, calories burned and maximum speed achieved. The game machine 10 accepts multiple forms of payment for gameplay such as paper currency, coins and credit cards. The preferred game machine includes a transparent torso cover 52 that allows players 24 to view the movement of internal components of the game machine 10. The machine may still be configured to communicate game information to the user via text, email, instant message, mobile notification, or other form of communication.

The game machine 10 may be configured to operate in two modes: gameplay mode and exercise mode. In the gameplay mode, overall pelvic/hip thrust output generated is measured either in watt-hours or in calories and is indicated on the visual game indicator at the head element 42. Here, individual players 24 may attempt to beat established high score and multiple players attempt to beat each other's scores. During the game, the players 24 attempt to follow a game needle by continuously adjusting their thrusting speed. As the main scoreboard needle moves randomly up and down through the game scale, the player 24 attempts to align the game needle 56 with the main scoreboard needle 58. The closer they are able to follow the position of the main scoreboard needle 58 the higher the score at the end of the game. In the exercise mode, user is meant to continuously provide thrusting for a set duration while calories burned and other exercise indicators are presented on the head/display.

Figure 4:
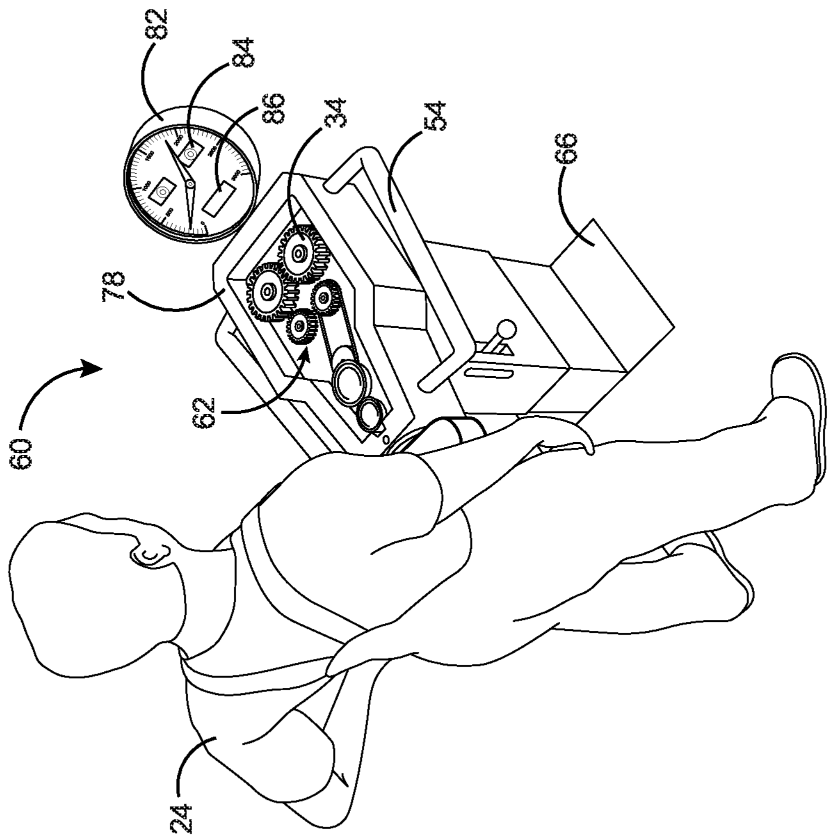
FIG. 4 shows a perspective view of another embodiment of the game machine illustrating a gear system according to the preferred embodiment of the present invention.
Figure 5:
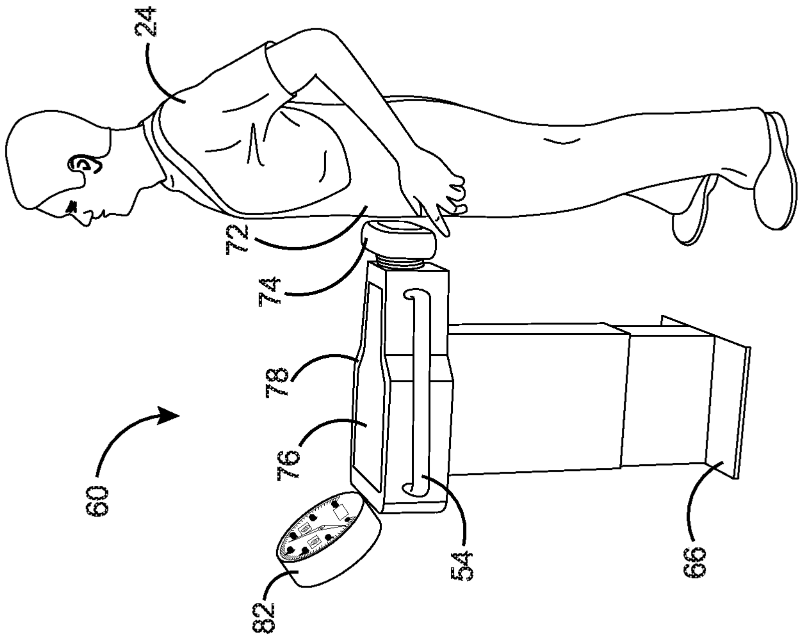
FIG. 5 shows a perspective view of another embodiment of the game machine illustrated in FIG. 4 in use according to the preferred embodiment of the present invention.

FIGS. 4 and 5 show another configuration of the present invention. The game machine 60 includes a gear system 34 as a means for providing resistance 62 to the reciprocating motion of the shaft member 18 (See FIG. 1). In use, as shown in FIG. 5, the game machine 60 enables the game player/exerciser 24 to stand on the floor plate 66 while performing and apply force to the thrusting pad element 74 via a pelvic/hip thrusting motion. The game machine 60 includes a transparent torso cover 76 and a handle member 54. The torso cover 76 protects the components inside the torso member 78 and allows the exerciser/player 24 to view the movement of internal components of the game machine 60. The handle member 54 provides a place for the player 24 to grip the game machine 60 during performance. The game machine 60 further includes a head element 82 attached to the torso member 78. The head element 82 includes a mouth element 86 configured to indicate state of the game such as whether the player 24 is doing well or not. The head element 82 further includes eyes 84 which change its state in order to create a facial expression. The player 24 thrusts his/her pelvic area 72 against the padded thrusting pad element 74. The floor plate 66 provides a heavy stable surface to attach the game machine 60 to the floor. The player 24 stands on the end of the floor plate 66 (variations of the floor plate are shown as 12 in FIGS. 1 and 100 in FIG. 7) during the game to provide additional stability to the game machine 60.

Figure 6:
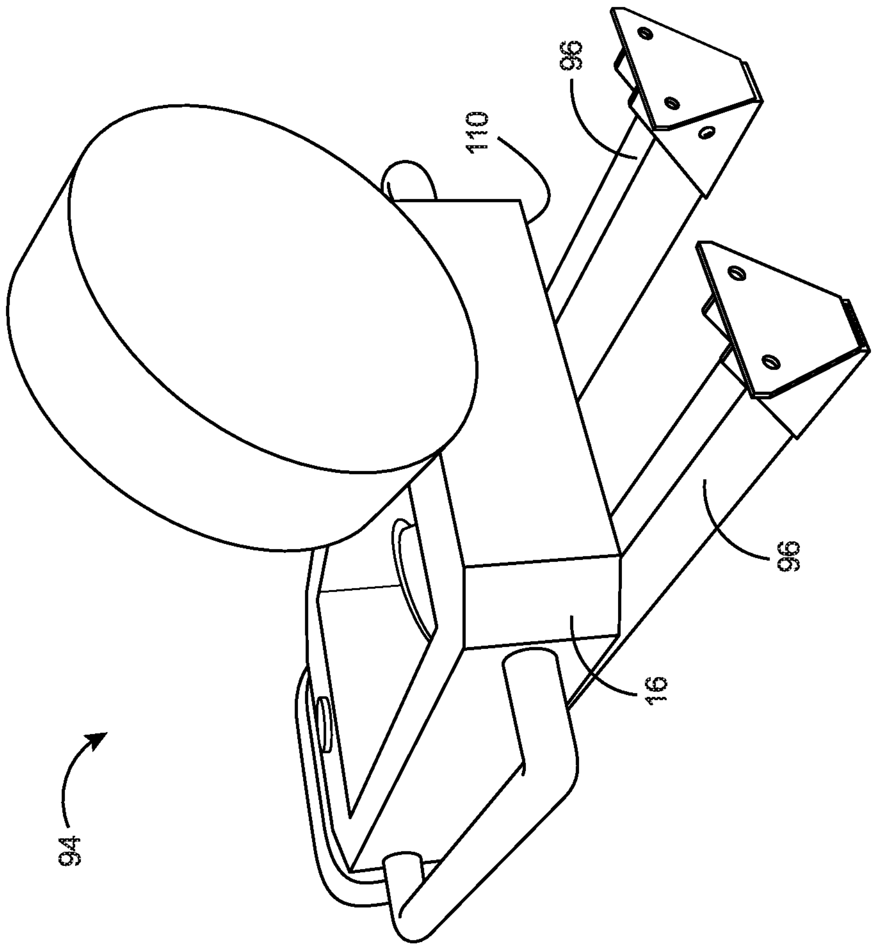
FIG. 6 shows a perspective view of another embodiment of the game machine illustrating a plurality of wall mounts according to the preferred embodiment of the present invention.

FIG. 6 shows another configuration of the game machine 94 having a plurality of wall mounts 96. The plurality of wall mounts 96 are connected to a rear portion 110 of the torso member 16 and is designed to firmly mount the game machine 94 on a wall.

Another configuration of the game machine 98 is shown in FIG. 7. The game machine 98 includes a bigger floor plate 100 adaptable to position a ballast weight 102 thereon. The ballast weight 102 is designed to hold different signage 104 and to provide stability to the game machine 106 (FIG. 8).

Yet another configuration of the game machine 106 is shown in FIG. 8. The game machine 106 includes a means for adjusting 108 an angle between the torso member 16 and the post member 14. The means for adjusting 108 also adjusts angle between the torso member 16 (FIG. 7) and the wall.

The foregoing description of the preferred embodiment of the present invention has been presented for the purpose of illustration and description. It is not intended to be exhaustive or to limit the invention to the precise form disclosed. Many modifications and variations are possible in light of the above teachings. For example, multiple game machines 10 can be connected together to allow simultaneous side-by-side competition between players. Further, the game machine 10 can be Internet connected to allow remote system monitoring/troubleshooting/competition. As well, global high scores and tracking use for exercise routines may enabled through an internet connected embodiment. Moreover, Internet connected game machines can be tied in with a mobile phone installed with a mobile application to track scores and exercise related use. It is intended that the scope of the present invention not be limited by this detailed description, but by the claims and the equivalents to the claims appended hereto.

What is claimed is:

1. A game machine for use by a player comprising:
- a. a torso member;
- b. a shaft member, the shaft member being partially inserted into a receiving face of the torso member, thereby establishing an interior end and an exterior end of the shaft member;
- c. a thrusting pad element connected to the exterior end of the shaft member;
- d. a means for providing resistance to a reciprocating motion of the shaft member located inside the torso member.

2. The game machine of claim 1, wherein the game machine is configured such that the shaft member may be moved in and out of the torso member by an application and release of force against the thrusting pad element by a pelvic thrusting motion of the player.

3. The game machine of claim 1, further including a post member perpendicularly connected to the torso member, the post member having an upper end and a lower end.

4. The game machine of claim 1, wherein the torso member is affixed to a wall.

5. The game machine of claim 2, further including a floor plate perpendicularly connected to the lower end of the post member.

6. The game machine of claim 2, further including a means for adjusting an angle between the torso member and the post member.

7. The game machine of claim 4, further including a means for adjusting an angle between the torso member and the wall.

8. The game machine of claim 1, further comprising at least one handle member located on an exterior surface of the torso member.

9. The game machine of claim 2, wherein the game machine is configured to allow the player to stand on the floor plate and apply force to the thrusting element via a pelvic thrusting motion thereby using the weight of the player to help stabilize the game machine.

10. The game machine of claim 1, wherein the means for providing resistance is selected from the group consisting of a gear system, a chain and sprocket system, a belt and pulley system, a spring system, a pneumatic system, an electromagnetic generator, a hydraulic fluid system, an electromagnetic alternator and an electromagnetic generator.

11. The game machine of claim 1, wherein the means for providing resistance comprises a chain and sprocket system coupled to an element selected from the group consisting of an electromagnetic alternator and an electromagnetic generator.

12. The game machine of claim 1, wherein the means for providing resistance is coupled to a microcontroller; the microcontroller is configured to apply at least one game mode.

13. The game machine of claim 12, further comprising a head element attached to a top side of the torso member, the head element having one or more visual game indicators.

14. The game machine of claim 13, wherein the one or more visual game indicators are selected from the group consisting of a "High Score" indicator, a "Your Score" indicator, a "Calories Burned" indicator, a "Time Remaining" indicator, a "Current Speed" indicator, a "Player 1" indicator, a "Player 2" indicator, and a "Press Start" indicator.

15. The game machine of claim 13, wherein the head element includes a mouth element, the mouth element being configured to indicate whether the player is doing well.

16. The game machine of claim 13, further comprising at least one audio speaker coupled to the microcontroller.

17. The game machine of claim 16, wherein the audio speaker is configured to provide audio clips according to the game mode.

18. The game machine of claim 16, wherein the audio speaker is configured to play music according to the game mode.

19. The game machine of claim 16, wherein the audio speaker is configured to provide audio indicators to the player according to the game mode.

20. The game machine of claim 16, wherein the speaker is configured to play one or more audio clips/music designed to entice a person to play while the game machine is not in use.

21. The game machine of claim 12, wherein the microcontroller is programmed to measure the energy expended by the player.

22. The game machine of claim 12, wherein the microcontroller is programmed to measure the thrusting speed achieved by the player.

23. The game machine of claim 1, wherein the height of the post member is adjustable.

24. The game machine of claim 1, wherein at least one side of the torso member is transparent.

25. The game machine of claim 12, further including a second game machine as in claim REF_Ref2613608 \r \h 12, wherein the second game machine is configured to allow for a player of the second game machine to compete against the player of the first game machine.

26. The game machine of claim 12, wherein the game machine includes an internet connection and the game machine is configured to send game related communication to the player via a method selected from the group consisting of text message, multimedia message, SMS message, email message, push notification.

27. The game machine of claim 25, each game machine having an internet connection, wherein the game machines are coupled to each other remotely via the internet.

28. The game machine of claim 26, wherein the game machine is coupled to a remote server, the remote server being configured to establish and manage at least one user account associated with the player.

* * * * *